(12) United States Patent
Kamada

(10) Patent No.: US 10,093,388 B2
(45) Date of Patent: Oct. 9, 2018

(54) BICYCLE REAR SPROCKET ASSEMBLY

(71) Applicant: SHIMANO INC., Sakai (JP)

(72) Inventor: Kenji Kamada, Sakai (JP)

(73) Assignee: SHIMANO INC., Sakai (JP)

( * ) Notice: Subject to any disclaimer, the term of this patent is extended or adjusted under 35 U.S.C. 154(b) by 255 days.

(21) Appl. No.: 15/195,969

(22) Filed: Jun. 28, 2016

(65) Prior Publication Data

US 2017/0369124 A1 Dec. 28, 2017

(51) Int. Cl.
- F16H 55/12 (2006.01)
- F16H 55/30 (2006.01)
- B62M 9/10 (2006.01)

(52) U.S. Cl.
CPC ............. B62M 9/10 (2013.01); F16H 55/30 (2013.01)

(58) Field of Classification Search
CPC . B62M 9/10; B62M 9/12; F16D 41/30; F16D 1/108; B60B 27/026
USPC .......................................................... 474/160
See application file for complete search history.

(56) References Cited

U.S. PATENT DOCUMENTS

| | | | | |
|---|---|---|---|---|
| 3,900,088 A * | 8/1975 | Ozaki | ...................... | B62M 9/10 192/64 |
| 4,121,474 A * | 10/1978 | Arregui Suinaga | .... | F16D 41/30 474/160 |
| 4,324,323 A * | 4/1982 | Campagnolo | ........... | F16D 41/30 192/64 |
| 4,486,184 A * | 12/1984 | Campagnolo | ............ | B62M 9/10 384/547 |
| 5,480,357 A * | 1/1996 | Liang | ........................ | B62M 9/10 474/160 |
| 5,503,600 A * | 4/1996 | Berecz | ...................... | B62M 9/10 474/160 |
| 6,264,575 B1 * | 7/2001 | Lim | .......................... | B62M 9/10 192/64 |
| 6,382,381 B1 * | 5/2002 | Okajima | ................ | B60B 1/0215 192/64 |
| 6,428,437 B1 * | 8/2002 | Schlanger | ................ | B62M 9/10 474/160 |
| 6,866,604 B2 * | 3/2005 | Kamada | ................. | B60B 27/026 474/152 |
| 7,011,592 B2 * | 3/2006 | Shahana | ................... | B62M 9/10 474/152 |
| 7,351,171 B2 * | 4/2008 | Kanehisa | ............... | B60B 27/026 301/111.02 |
| 7,931,553 B2 * | 4/2011 | Tokuyama | ............... | B62M 9/10 474/144 |

(Continued)

*Primary Examiner* — Henry Y Liu (74) *Attorney, Agent, or Firm* — Mori & Ward, LLP (57) ABSTRACT

A first sprocket includes a first opening having a first diameter smaller than a radially outer diameter of a sprocket support portion of a bicycle rear hub assembly. A lock member includes a main body, a male thread portion, and a radial projection. The main body has a first axial end configured to pass through the first opening and a second axial end opposite to the first axial end in an axial direction. The male thread portion is provided to the first axial end and configured to engage with a female thread portion of the bicycle rear hub assembly in a state where a bicycle rear sprocket assembly is mounted to the bicycle rear hub assembly. The radial projection extends radially outwardly from the second axial end to restrict axial displacement of the first sprocket with respect to the sprocket support portion in the state.

24 Claims, 7 Drawing Sheets

(56) References Cited

U.S. PATENT DOCUMENTS

| | | | | |
|---|---|---|---|---|
| 8,197,371 B2* | 6/2012 | D'Aluisio | ................ | B62M 9/12 301/110.5 |
| 8,641,151 B2* | 2/2014 | Kamada | ................ | B62M 9/125 192/64 |
| 8,821,330 B2* | 9/2014 | Dal Pra' | ................ | B62M 9/10 474/160 |
| 9,193,416 B2* | 11/2015 | Tokuyama | ............... | B62M 9/10 |
| 9,533,735 B2* | 1/2017 | Braedt | ................ | B62M 9/10 |
| 9,550,547 B2* | 1/2017 | Valle | ................ | B62M 9/10 |
| 9,738,349 B2* | 8/2017 | Braedt | ................ | B62M 9/10 |
| 9,771,127 B2* | 9/2017 | Braedt | ................ | B62M 9/10 |
| 9,822,865 B2* | 11/2017 | Chen | ................ | B60B 27/0026 |
| 9,868,491 B1* | 1/2018 | Oishi | ................ | B62M 9/10 |
| 2002/0020984 A1* | 2/2002 | Dunkley | ................ | B60T 1/10 280/215 |
| 2003/0064844 A1* | 4/2003 | Lin | ................ | B62M 9/10 474/160 |
| 2003/0171180 A1* | 9/2003 | Shahana | ................ | B62M 9/10 474/152 |
| 2008/0004143 A1* | 1/2008 | Kanehisa | ................ | B62M 9/10 474/160 |
| 2011/0092327 A1* | 4/2011 | Oishi | ................ | B62M 9/10 474/160 |
| 2012/0225745 A1* | 9/2012 | Oishi | ................ | B62M 9/10 474/160 |
| 2012/0244977 A1* | 9/2012 | Liao | ................ | B62M 9/10 474/160 |
| 2012/0244978 A1* | 9/2012 | Liao | ................ | B62M 9/10 474/160 |
| 2012/0302384 A1* | 11/2012 | Braedt | ................ | B62M 9/10 474/160 |
| 2012/0322598 A1* | 12/2012 | Lin | ................ | B62M 9/10 474/160 |
| 2013/0017914 A1* | 1/2013 | Braedt | ................ | B62M 9/10 474/160 |
| 2015/0024884 A1* | 1/2015 | Braedt | ................ | B62M 9/10 474/78 |
| 2015/0133249 A1* | 5/2015 | Tsai | ................ | B62M 9/12 474/160 |

* cited by examiner

BICYCLE REAR SPROCKET ASSEMBLY

BACKGROUND OF THE INVENTION

Field of the Invention

The present invention relates to a bicycle rear sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle rear sprocket assembly.

SUMMARY OF THE INVENTION

In accordance with a first aspect of the present invention, a bicycle rear sprocket assembly is configured to be mounted to a sprocket support portion of a bicycle rear hub assembly. The bicycle rear sprocket assembly comprises a first sprocket, and a lock member. The first sprocket includes a first bicycle inbound facing surface, a first bicycle outbound facing surface, a first opening, and a first torque-transmitting structure. The first bicycle outbound facing surface is opposite to the first bicycle inbound facing surface in an axial direction parallel to a rotational center axis of the bicycle rear sprocket assembly. The first opening has a first diameter that is smaller than a radially outer diameter of the sprocket support portion of the bicycle rear hub assembly. The first torque-transmitting structure is provided to the first bicycle inbound facing surface and configured to transmit pedaling torque to a second sprocket adjacent to the first sprocket without another sprocket between the first sprocket and the second sprocket in the axial direction. The lock member includes a main body, a male thread portion, and a radial projection. The main body has a first axial end configured to pass through the first opening of the first sprocket and a second axial end opposite to the first axial end in the axial direction. The first axial end is positioned closer to an axial centerline of the bicycle rear hub assembly than the second axial end in a state where the bicycle rear sprocket assembly is mounted to the bicycle rear hub assembly. The male thread portion is provided to the first axial end. The male thread portion is configured to engage with a female thread portion of the bicycle rear hub assembly in the state where the bicycle rear sprocket assembly is mounted to the bicycle rear hub assembly. The radial projection extends radially outwardly from the second axial end with respect to the rotational center axis to restrict axial displacement of the first sprocket with respect to the sprocket support portion of the bicycle rear hub assembly in the state where the bicycle rear sprocket assembly is mounted to the bicycle rear hub assembly.

With the bicycle rear sprocket assembly according to the first aspect, it is possible to mount the first sprocket, which is a radially small sprocket having less than or equal to ten teeth, to the bicycle rear hub assembly with the lock member. Accordingly, a bicycle to which the bicycle rear sprocket assembly is mounted can have a wide range of gear ratio.

In accordance with a second aspect of the present invention, the bicycle rear sprocket assembly according to the first aspect is configured so that the main body of the lock member has a second diameter that is equal to or smaller than the first diameter of the first opening of the first sprocket.

With the bicycle rear sprocket assembly according to the second aspect, it is possible to mount the first sprocket, which is a radially small sprocket having less than or equal to ten teeth, to the bicycle rear hub assembly with the lock member. Accordingly, a bicycle to which the bicycle rear sprocket assembly is mounted can have a wide range of gear ratio.

In accordance with a third aspect of the present invention, the bicycle rear sprocket assembly according to any one of the above aspects is configured so that the radial projection is positioned farther from the axial centerline of the bicycle rear hub assembly than the first bicycle inbound facing surface of the first sprocket in the state where the bicycle rear sprocket assembly is mounted to the bicycle rear hub assembly.

With the bicycle rear sprocket assembly according to the third aspect, the radial projection can prevent unnecessary axial displacement of the first sprocket with respect to the sprocket support portion of the bicycle rear hub assembly.

In accordance with a fourth aspect of the present invention, the bicycle rear sprocket assembly according to any one of the above aspects is configured so that the radial projection is configured to abut against the first bicycle outbound facing surface of the first sprocket in the state where the bicycle rear sprocket assembly is mounted to the bicycle rear hub assembly.

With the bicycle rear sprocket assembly according to the fourth aspect, the radial projection can prevent unnecessary axial displacement of the first sprocket with respect to the sprocket support portion of the bicycle rear hub assembly.

In accordance with a fifth aspect of the present invention, the bicycle rear sprocket assembly according to any one of the above aspects is configured so that the radial projection is configured to indirectly abut against the first bicycle outbound facing surface of the first sprocket via an intermediate member in the state where the bicycle rear sprocket assembly is mounted to the bicycle rear hub assembly.

With the bicycle rear sprocket assembly according to the fifth aspect, the radial projection can prevent unnecessary axial displacement of the first sprocket with respect to the sprocket support portion of the bicycle rear hub assembly.

In accordance with a sixth aspect of the present invention, the bicycle rear sprocket assembly according to any one of the above aspects is configured so that the first sprocket has a first total tooth number that is equal to or smaller than ten.

With the bicycle rear sprocket assembly according to the sixth aspect, it is possible to mount the first sprocket, which is a radially small sprocket having less than or equal to ten teeth, to the bicycle rear hub assembly with the lock member. Accordingly, a bicycle to which the bicycle rear sprocket assembly is mounted can have a wide range of gear ratio.

In accordance with a seventh aspect of the present invention, the bicycle rear sprocket assembly according to any one of the above aspects further comprises the second sprocket. The second sprocket includes a second bicycle inbound facing surface, a second bicycle outbound facing surface, a second torque-transmitting structure, and a third torque-transmitting structure. The second bicycle outbound facing surface is opposite to the second bicycle inbound facing surface in the axial direction. The second torque-transmitting structure is provided to the second bicycle inbound facing surface. The third torque-transmitting structure is provided to the second bicycle outbound facing surface. The third torque-transmitting structure is configured to engage with the first torque-transmitting structure in the state where the bicycle rear sprocket assembly is mounted to the bicycle rear hub assembly.

With the bicycle rear sprocket assembly according to the seventh aspect, it is possible to mount the first and second sprockets, which are radially small sprockets, to the bicycle rear hub assembly with the lock member. Accordingly, a bicycle rider can have more gear choices in a wide range of gear ratio with respect to the bicycle rear sprocket assembly.

In accordance with an eighth aspect of the present invention, the bicycle rear sprocket assembly according to any one of the above aspects is configured so that the first sprocket has a first total tooth number. The second sprocket has a second total tooth number that is larger than the first total tooth number.

With the bicycle rear sprocket assembly according to the eighth aspect, it is possible to mount the first and second sprockets, which are radially small sprockets, to the bicycle rear hub assembly with the lock member. Accordingly, a bicycle rider can have more gear choices in a wide range of gear ratio with respect to a bicycle rear sprocket assembly.

In accordance with a ninth aspect of the present invention, the bicycle rear sprocket assembly according to any one of the above aspects is configured so that the first total tooth number is equal to or smaller than ten. The second total tooth number is eleven.

With the bicycle rear sprocket assembly according to the ninth aspect, it is possible to mount the first and second sprockets, which are radially small sprockets, to the bicycle rear hub assembly with the lock member. Accordingly, a bicycle rider can have more gear choices in a wide range of gear ratio with respect to the bicycle rear sprocket assembly.

In accordance with a tenth aspect of the present invention, the bicycle rear sprocket assembly according to any one of the above aspects is configured so that the second torque-transmitting structure is configured to engage with a torque-transmitting structure provided to the sprocket support portion of the bicycle rear hub assembly in the state where the bicycle rear sprocket assembly is mounted to the bicycle rear hub assembly.

With the bicycle rear sprocket assembly according to the tenth aspect, it is possible to reliably transmit the pedaling torque from the first sprocket to the bicycle rear hub assembly via the second sprocket.

In accordance with an eleventh aspect of the present invention, the bicycle rear sprocket assembly according to any one of the above aspects is configured so that the first sprocket has an axially recessed portion formed on the first bicycle outbound facing surface. The axially recessed portion is configured to receive the radial projection of the lock member in the state where the bicycle rear sprocket assembly is mounted to the bicycle rear hub assembly.

With the bicycle rear sprocket assembly according to the eleventh aspect, the axially recessed portion can receive the radial projection of the lock member without the radial projection of the lock member protruding from the first sprocket in the axial direction. Accordingly, the bicycle rear sprocket assembly can be miniaturized in the axial direction.

In accordance with a twelfth aspect of the present invention, the bicycle rear sprocket assembly according to any one of the above aspects is configured so that the radial projection has a first tapered surface. The axially recessed portion has a second tapered surface that fits the first tapered surface of the radial projection in the state where the bicycle rear sprocket assembly is mounted to the bicycle rear hub assembly.

With the bicycle rear sprocket assembly according to the twelfth aspect, the radial projection can firmly attach the first sprocket to the bicycle rear hub assembly. Further, the first tapered surface of the radial projection and the second tapered surface of the axially recessed portion can provide a guiding function for the lock member relative to the first sprocket while the lock member is screwed into the bicycle rear hub assembly.

In accordance with a thirteenth aspect of the present invention, the bicycle rear sprocket assembly according to any one of the above aspects is configured so that the first sprocket includes a first radially inner peripheral surface around the rotational center axis, the first radially inner peripheral surface defining the first opening. The lock member has a radially outer surface configured to support of the first radially inner peripheral surface of the first sprocket in the state where the bicycle rear sprocket assembly is mounted to the bicycle rear hub assembly.

With the bicycle rear sprocket assembly according to the thirteenth aspect, the lock member can stabilize a radial position of the first sprocket.

In accordance with a fourteenth aspect of the present invention, the bicycle rear sprocket assembly according to any one of the above aspects is configured so that the male thread portion of the lock member has a first axial length in the axial direction. The radially outer surface of the lock member has a second axial length in the axial direction. The first axial length of the male thread portion is larger than the second axial length of the radially outer surface.

With the bicycle rear sprocket assembly according to the fourteenth aspect, the lock member can be screwed into the bicycle rear hub assembly enough to be fastened to the bicycle rear hub assembly reliably.

In accordance with a fifteenth aspect of the present invention, the bicycle rear sprocket assembly according to any one of the above aspects is configured so that the first sprocket includes a first radially inner peripheral surface around the rotational center axis. The first radially inner peripheral surface defines the first opening. The lock member has a radially outer surface configured to be spaced apart from the first radially inner peripheral surface of the first sprocket in a radial direction with respect to the rotational center axis in the state where the bicycle rear sprocket assembly is mounted to the bicycle rear hub assembly.

With the bicycle rear sprocket assembly according to the fifteenth aspect, a gap between the first radially inner peripheral surface of the first sprocket and the radially outer surface of the lock member is formed in the state where the bicycle rear sprocket assembly is mounted to the bicycle rear hub assembly, and the gap can absorb dimensional tolerances of the first radially inner peripheral surface of the first sprocket and the radially outer surface of the lock member.

In accordance with a sixteenth aspect of the present invention, the bicycle rear sprocket assembly according to the fifteen aspect is configured so that the male thread portion of the lock member has a first axial length in the axial direction. The radially outer surface of the lock member has a second axial length in the axial direction. The first axial length of the male thread portion is larger than the second axial length of the radially outer surface.

With the bicycle rear sprocket assembly according to the sixteenth aspect, the lock member can be screwed into the bicycle rear hub assembly enough to be fastened to the bicycle rear hub assembly reliably.

In accordance with a seventeenth aspect of the present invention, the bicycle rear sprocket assembly according to any one of the above aspects further comprises the second sprocket and a third sprocket. The second sprocket includes a second bicycle inbound facing surface, a second bicycle outbound facing surface, a second torque-transmitting structure, and a third torque-transmitting structure. The second bicycle outbound facing surface is opposite to the second bicycle inbound facing surface in the axial direction. The second torque-transmitting structure is provided to the second bicycle inbound facing surface. The third torque-transmitting structure is provided to the second bicycle outbound facing surface. The third torque-transmitting structure is configured to engage with the first torque-transmitting structure of the first sprocket in the state where the bicycle rear sprocket assembly is mounted to the bicycle rear hub assembly. The third sprocket includes a third bicycle inbound facing surface, a third bicycle outbound facing surface, and a fourth torque-transmitting structure. The third bicycle outbound facing surface is opposite to the third bicycle inbound facing surface in the axial direction. The fourth torque-transmitting structure is provided to the third bicycle inbound facing surface. The fourth torque-transmitting structure is configured to engage with a torque-transmitting structure provided to the sprocket support portion of the bicycle rear hub assembly in the state where the bicycle rear sprocket assembly is mounted to the bicycle rear hub assembly.

With the bicycle rear sprocket assembly according to the seventeenth aspect, it is possible to mount the first to third sprockets, which are radially small sprockets, to the bicycle rear hub assembly with the lock member. Accordingly, a rider who rides a bicycle to which the bicycle rear sprocket assembly is mounted can have further more gear choices in a wide range of gear ratio.

In accordance with an eighteenth aspect of the present invention, the bicycle rear sprocket assembly according to any one of the above aspects is configured so that the first sprocket has a first total tooth number. The second sprocket has a second total tooth number that is larger than the first total tooth number. The third sprocket has a third total tooth number that is larger than the second total tooth number.

With the bicycle rear sprocket assembly according to the eighteenth aspect, it is possible to mount the first to third sprockets, which are radially small sprockets, to the bicycle rear hub assembly with the lock member. Accordingly, a bicycle rider can have further more gear choices in a wide range of gear ratio with respect to the bicycle rear sprocket assembly.

In accordance with a nineteenth aspect of the present invention, the bicycle rear sprocket assembly according to any one of the above aspects is configured so that the first torque-transmitting structure includes a plurality of first splines.

With the bicycle rear sprocket assembly according to the nineteenth aspect, it is possible to reliably transmit the pedaling torque from the first sprocket to the second sprocket.

In accordance with a twentieth aspect of the present invention, the bicycle rear sprocket assembly according to any one of the above aspects is configured so that the second torque-transmitting structure includes a plurality of second splines.

With the bicycle rear sprocket assembly according to the twentieth aspect, it is possible to reliably transmit the pedaling torque from the second sprocket to the sprocket support portion of the of the bicycle rear hub assembly.

In accordance with a twenty-first aspect of the present invention, the bicycle rear sprocket assembly according to any one of the above aspects is configured so that the third torque-transmitting structure includes a plurality of third splines.

With the bicycle rear sprocket assembly according to the twenty-first aspect, it is possible for the second sprocket to reliably receive the pedaling torque from the first sprocket.

In accordance with a twenty-second aspect of the present invention, the bicycle rear sprocket assembly according to any one of the above aspects is configured so that the radial projection is integrally formed with the main body as a one-piece unitary member.

With the bicycle rear sprocket assembly according to the twenty-second aspect, it is possible to enhance rigidity of the radial projection.

In accordance with a twenty-third aspect of the present invention, the bicycle rear sprocket assembly according to any one of the above aspects is configured so that the radial projection has an annular flange shape.

With the bicycle rear sprocket assembly according to the twenty-third aspect, it is possible to enhance rigidity of the radial projection.

In accordance with a twenty-fourth aspect of the present invention, the bicycle rear sprocket assembly according to any one of the above aspects further comprises a plurality of additional sprockets each of which is larger than the first sprocket and the second sprocket.

With the bicycle rear sprocket assembly according to the twenty-fourth aspect, it is possible to mount the plurality of additional sprockets to the bicycle rear hub assembly with the lock member. Accordingly, a bicycle to which the bicycle rear sprocket assembly is mounted can have a wide range of gear ratio.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

First Embodiment

Figure 1:
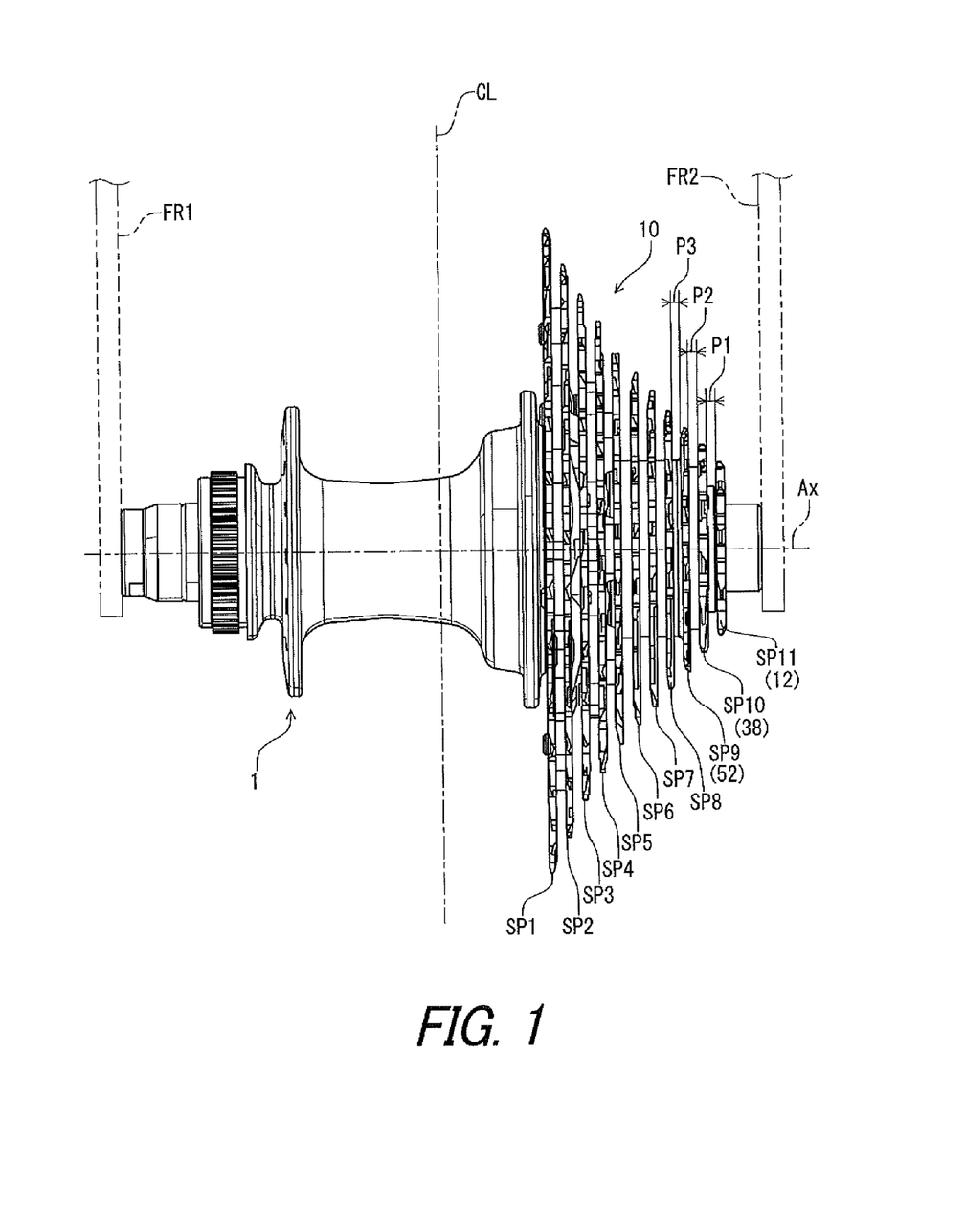
FIG. 1 is an elevational view of a bicycle rear sprocket assembly attached to a bicycle rear hub assembly in accordance with a first embodiment.

FIG. 1 illustrates a bicycle rear sprocket assembly 10 attached to a bicycle rear hub assembly 1 in accordance with a first embodiment. In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle (not shown) with facing a handlebar. Accordingly, these terms, as utilized to describe the bicycle rear hub assembly 1 and the bicycle rear sprocket assembly 10, should be interpreted relative to the bicycle equipped with the bicycle rear hub assembly 1 and the bicycle rear sprocket assembly 10 as used in an upright riding position on a horizontal surface.

Figure 2:
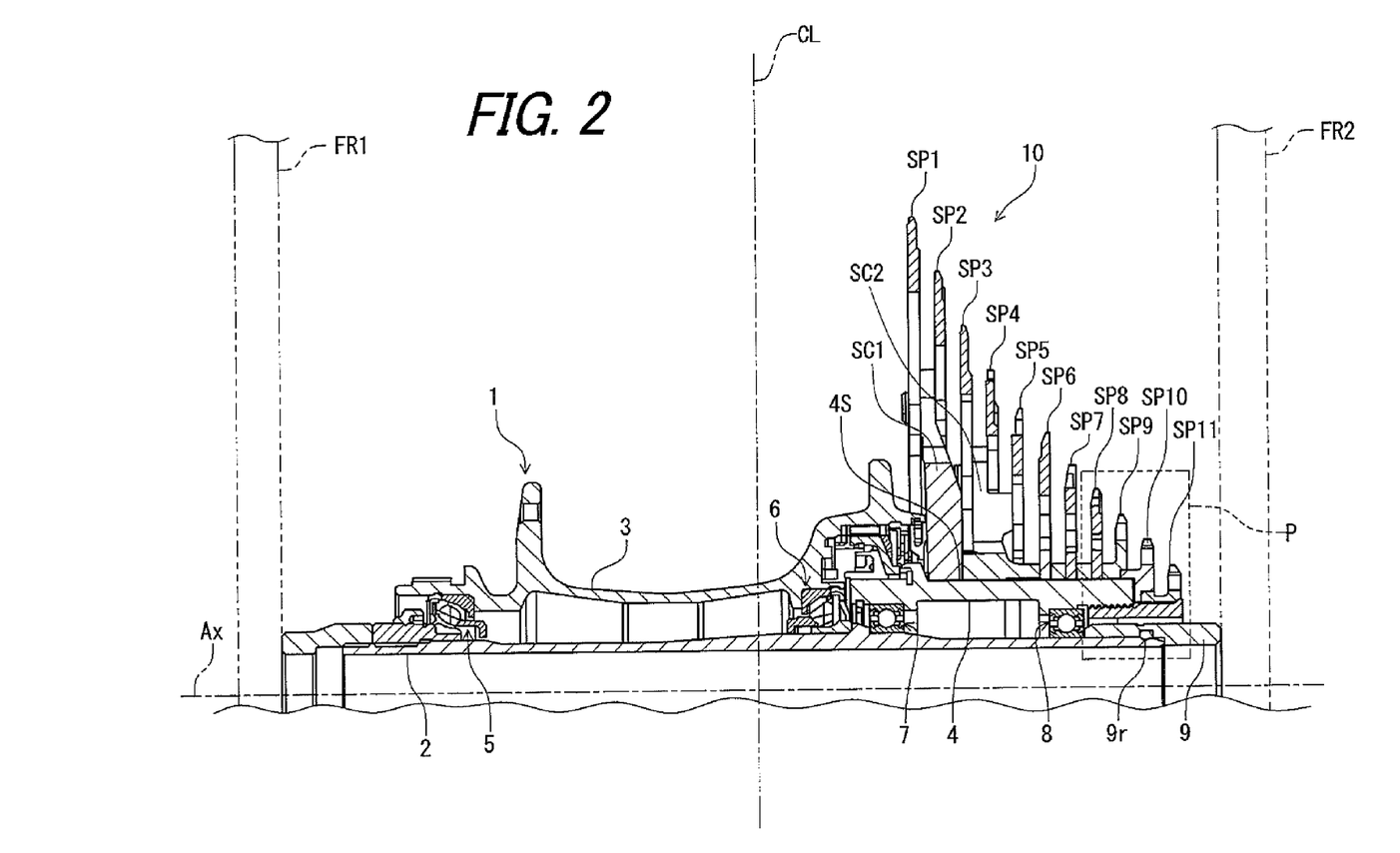
FIG. 2 is a partially cross-sectional view of the bicycle rear sprocket assembly illustrated in FIG. 1.

As seen in FIG. 2, the bicycle rear hub assembly 1 comprises a hub axle 2, a hub shell 3, and a sprocket support portion 4. The hub axle 2 defines a rotational center axis Ax. The rotational center axis Ax can be regarded as the rotational center axis Ax of the bicycle rear sprocket assembly 10 because the bicycle rear sprocket assembly 10 is coaxially mounted to the bicycle rear hub assembly 1. The hub axle 2 has a tubular shape and extends along the rotational center axis Ax. The hub axle 2 is secured to bicycle frames FR1, FR2 via a wheel securing assembly (not shown). The bicycle frames FR1 indicate a left seat stay and a left chain stay. The bicycle frames FR2 indicate a right seat stay and a right chain stay. The hub shell 3 is rotatably mounted on the hub axle 2 to rotate about the rotational center axis Ax. The sprocket support portion 4 is rotatably mounted on the hub axle 2 to rotate about the rotational center axis Ax. The bicycle frames FR1, FR2 defines an axial centerline CL of the bicycle rear hub assembly 1 which extends in the middle of the bicycle frames FR1, FR2 as viewed in a radial direction perpendicular to the rotational center axis Ax.

Figure 4:
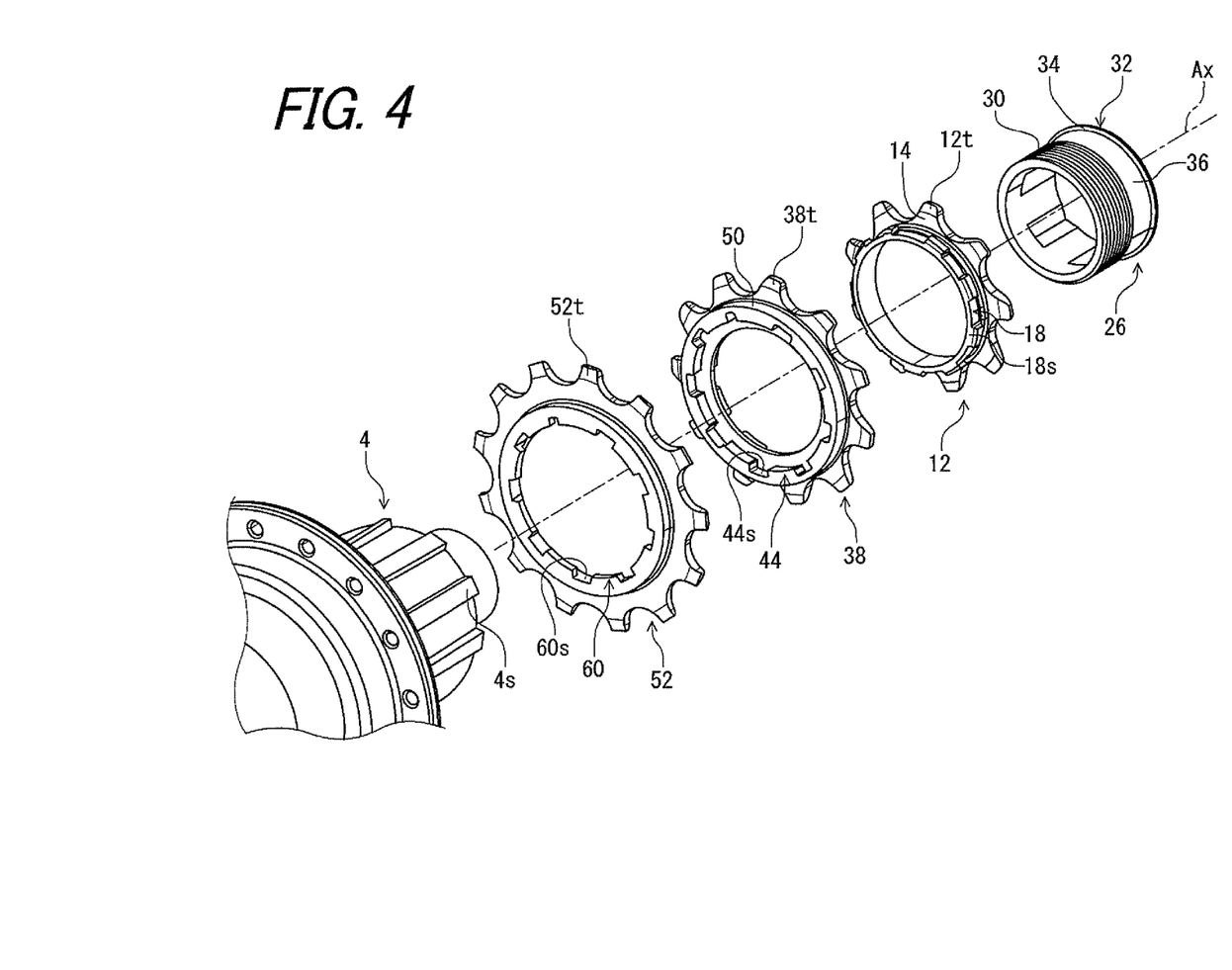
FIG. 4 is an exploded perspective view of a part of the bicycle rear sprocket assembly illustrated in FIG. 1.
Figure 5:
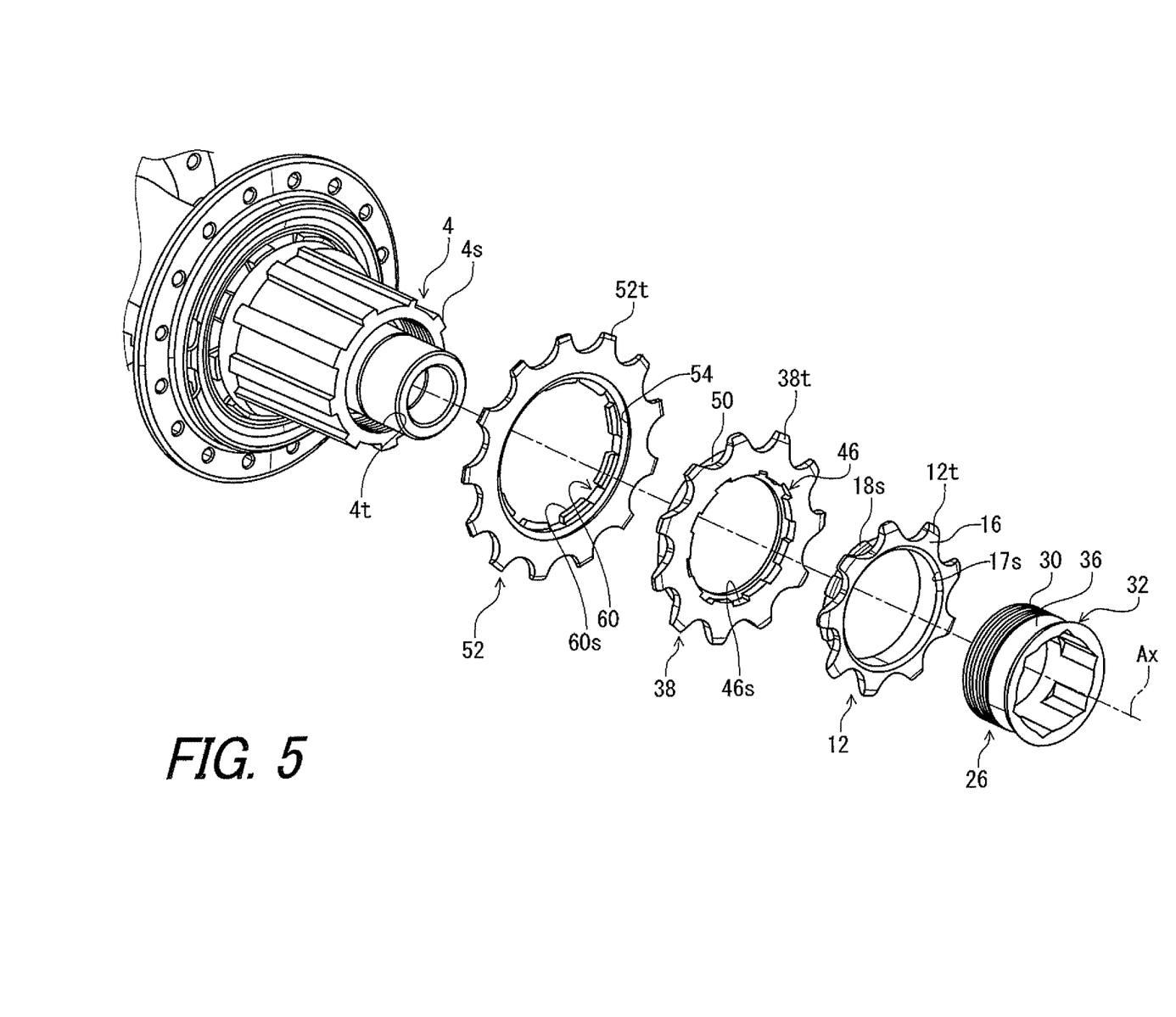
FIG. 5 is an exploded perspective view of a part of the bicycle rear sprocket assembly illustrated in FIG. 1.

As seen in FIG. 2, the sprocket support portion 4 is configured to support the bicycle rear sprocket assembly 10. That is, the bicycle rear sprocket assembly 10 is configured to be mounted to the sprocket support portion 4 of the bicycle rear hub assembly 1. The sprocket support portion 4 includes a torque-transmitting structure 4s on a radially outer peripheral surface of the sprocket support portion 4. The torque-transmitting structure 4s may include a plurality of splines (FIGS. 4 and 5). The sprocket support portion 4 is configured to receive a rotational force from the bicycle rear sprocket assembly 10 during pedaling. The bicycle rear hub assembly 1 comprises a first bearing unit 5 and a second bearing unit 6. The first bearing unit 5 and the second bearing unit 6 are provided between the hub axle 2 and the hub shell 3 to rotatably support the hub shell 3 relative to the hub axle 2 about the rotational center axis Ax.

The bicycle rear hub assembly 1 comprises a third bearing unit 7 and a fourth bearing unit 8. The third bearing unit 7 and the fourth bearing unit 8 are provided between the hub axle 2 and the sprocket support portion 4 to rotatably support the sprocket support portion 4 relative to the hub axle 2 about the rotational center axis Ax. Each of the third bearing unit 7 and the fourth bearing unit 8 has an annular shape. An outer surface of the third bearing unit 7 is secured to the sprocket support portion 4, and an inner surface of the third bearing unit 7 is secured to the hub axle 2. An outer surface of the fourth bearing unit 8 is secured to the sprocket support portion 4, and an inner surface of the fourth bearing unit 8 is secured to the hub axle 2. At least one of the third bearing unit 7 and the fourth bearing unit 8 can be the same structure as those of the first bearing unit 5 and the second bearing unit 6 if needed and/or desired. At least one of the first to fourth bearing units 5 to 8 can be a sliding bearing whereas each of the first to fourth bearing units 5 to 8 is a rolling bearing in the illustrated embodiment.

The bicycle rear hub assembly 1 comprises an end cap 9. The end cap 9 is mounted on the hub axle 2 to abut against an inner race of the fourth bearing unit 8. The end cap 9 is fixed on the hub axle 2 by an elastomeric member 9r (e.g. an O-ring 9r) at a position where the end cap 9 can abut against the inner race of the fourth bearing unit 8.

The bicycle rear sprocket assembly 10 comprises sprockets SP1 to SP11. A total number of the sprockets SP1 to SP11 are not limited to the illustrated embodiment. The sprockets SP1 to SP8 are conventional bicycle sprockets. Some of the sprockets SP1 to SP8 may be connected to a sprocket carrier having a plurality of splines, and the plurality of splines of the sprocket carrier can be engaged with the torque-transmitting structure 4s of the sprocket support portion 4. In the illustrated embodiment, the sprockets SP1 and SP2 are mounted to a first sprocket carrier SC1, and the sprockets SP3 and SP4 are mounted to a second sprocket carrier SC2. The others of the sprockets SP1 to SP8 may have splines and be engaged with the torque-transmitting structure 4s of the sprocket support portion 4. A total number of the sprockets SP1 to SP8 are not limited to the illustrated embodiment. In this embodiment, the sprocket SP11, the sprocket SP10, the sprockets SP1 to SP9 can be referred to as a first sprocket, a second sprocket, and a plurality of additional sprockets, respectively. The bicycle rear sprocket assembly 10 comprises a plurality of additional sprockets SP1 to SP9 each of which is larger than the first sprocket SP11 and second sprocket SP10. Nevertheless, the sprocket SP9 may be also referred to as a third sprocket.

Figure 3:
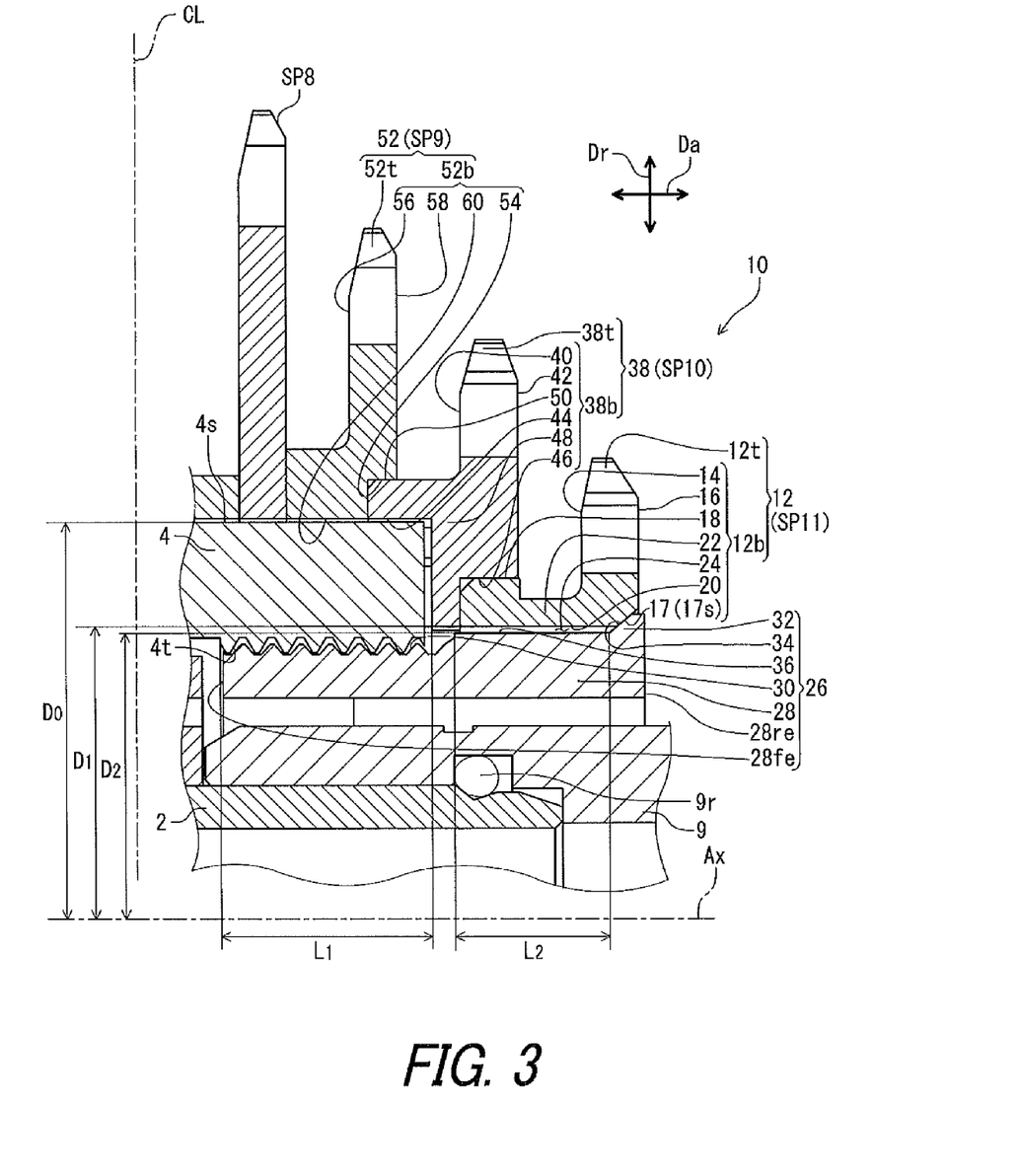
FIG. 3 is an enlarged partially cross-sectional view of a part P of the bicycle rear sprocket assembly illustrated in FIG. 2.

As seen in FIG. 3, the bicycle rear sprocket assembly 10 comprises a first sprocket 12 (SP11) and a lock member 26. The first sprocket 12 includes a first tooth portion 12t and a first sprocket body 12b. The first tooth portion 12t has a plurality of teeth. In the following description, the total number of teeth of the first sprocket 12 is referred to as a first total tooth number. The first sprocket 12 has the first total tooth number. Preferably, the first total tooth number is equal to or smaller than ten.

The first sprocket body 12b includes a first bicycle inbound facing surface 14, a first bicycle outbound facing surface 16, a first torque-transmitting structure 18, a first radially inner peripheral surface 20, and a first connection portion 22. The first radially inner peripheral surface 20 defines a first opening 24. That is, the first sprocket 12 includes the first radially inner peripheral surface 20 around the rotational center axis Ax. The first sprocket 12 includes the first bicycle inbound facing surface 14, the first bicycle outbound facing surface 16, the first opening 24, and the first torque-transmitting structure 18. The first bicycle inbound facing surface 14 faces toward the axial centerline CL of the bicycle rear hub assembly 1. The first bicycle outbound facing surface 16 is opposite to the first bicycle inbound facing surface 14 in an axial direction Da parallel to the rotational center axis Ax of the bicycle rear sprocket assembly 10. In other words, the first bicycle outbound facing surface 16 faces in a reverse direction with respect to the axial direction Da in comparison with the first bicycle inbound facing surface 14. The first opening 24 has a first diameter $D_1$ that is smaller than a radially outer diameter $D_O$ of the sprocket support portion 4 of the bicycle rear hub assembly 1.

The first torque-transmitting structure 18 is configured to transmit pedaling torque to a second sprocket 38 (SP10) adjacent to the first sprocket 12 without another sprocket between the first sprocket 12 and the second sprocket 38 in the axial direction Da. The first torque-transmitting structure 18 is connected to the first bicycle inbound facing surface 14 via the first connection portion 22. That is, the first torque-transmitting structure 18 is provided to the first bicycle inbound facing surface 14. The first connection portion 22 has an axial length in the axial direction Da which is equal to a sprocket pitch P1 (FIG. 1) between the first sprocket 12 and the second sprocket 38 in the axial direction Da.

The lock member 26 includes a main body 28, a male thread portion 30, and a radial projection 32. The main body 28 has a first axial end 28fe and a second axial end 28re. The first axial end 28fe is configured to pass through the first opening 24 of the first sprocket 12. The first axial end 28fe faces toward the axial centerline CL of the bicycle rear hub assembly 1. The second axial end 28re is opposite to the first axial end 28fe in the axial direction Da. In other words, the second axial end 28re is located on the other side of the first axial end 28fe in the axial direction Da. The first axial end 28fe is positioned closer to the axial centerline CL of the bicycle rear hub assembly 1 than the second axial end 28re in a state where the bicycle rear sprocket assembly 10 is mounted to the bicycle rear hub assembly 1. The main body 28 of the lock member 26 has a second diameter $D_2$ that is equal to or smaller than the first diameter $D_1$ of the first opening 24 of the first sprocket 12.

The male thread portion 30 is provided to the first axial end 28fe. Specifically, the male thread portion 30 is provided in proximity to the first axial end 28fe. The sprocket support portion 4 further includes a female thread portion 4t on a radially inner peripheral surface of the sprocket support portion 4. Each of the female thread portion 4t and the male thread portion 30 includes a thread groove. The male thread portion 30 is configured to engage with the female thread portion 4t of the bicycle rear hub assembly 1 in the state where the bicycle rear sprocket assembly 10 is mounted to the bicycle rear hub assembly 1.

As seen in FIGS. 3 to 5, the radial projection 32 has an annular flange shape. The radial projection 32 may have a pin-like shape. The radial projection 32 may include a plurality of projections each of which has a pin-like shape. The plurality of pin-like projections can be disposed on the second axial end 28re so as to be spaced from each other at a regular interval in a circumferential direction with respect to the rotational center axis Ax. The radial projection 32 is integrally formed with the main body 28 as a one-piece unitary member. Alternatively, the radial projection 32 can be a separate member from the main body 28. In such a case, the radial projection 32 can be attached to the main body 28 by one of adhesive, a welding process and diffusion bonding. The lock member 26 is preferably made of a metallic material such as aluminum or iron. The radial projection 32 can be a different metallic material from that of the main body 28.

As seen in FIG. 3, the radial projection 32 extends radially outwardly from the second axial end 28re with respect to the rotational center axis Ax to restrict axial displacement of the first sprocket 12 with respect to the sprocket support portion 4 of the bicycle rear hub assembly 1 in the state where the bicycle rear sprocket assembly 10 is mounted to the bicycle rear hub assembly 1. That is, the radial projection 32 is configured to abut against the first bicycle outbound facing surface 16 of the first sprocket 12 in the state where the bicycle rear sprocket assembly 10 is mounted to the bicycle rear hub assembly 1. The radial projection 32 is positioned farther from the axial centerline CL of the bicycle rear hub assembly 1 than the first bicycle inbound facing surface 14 of the first sprocket 12 in the state where the bicycle rear sprocket assembly 10 is mounted to the bicycle rear hub assembly 1.

As seen in FIG. 3, the first sprocket 12 has an axially recessed portion 17 formed on the first bicycle outbound facing surface 16. Specifically, the first sprocket body 12b includes the axially recessed portion 17. The axially recessed portion 17 is recessed in the axial direction Da. The axially recessed portion 17 is configured to receive the radial projection 32 of the lock member 26 in the state where the bicycle rear sprocket assembly 10 is mounted to the bicycle rear hub assembly 1. The radial projection 32 has a first tapered surface 34. The axially recessed portion 17 has a second tapered surface 17s that fits the first tapered surface 34 of the radial projection 32 in the state where the bicycle rear sprocket assembly 10 is mounted to the bicycle rear hub assembly 1.

The lock member 26 has a radially outer surface 36 between the male thread portion 30 and the first tapered surface 34 in the axial direction Da. The radially outer surface 36 is configured to be spaced apart from the first radially inner peripheral surface 20 of the first sprocket 12 in a radial direction Dr with respect to the rotational center axis Ax in the state where the bicycle rear sprocket assembly 10 is mounted to the bicycle rear hub assembly 1. The radial direction Dr is perpendicular to the axial direction Da. The male thread portion 30 of the lock member 26 has a first axial length $L_1$ in the axial direction Da. The radially outer surface 36 of the lock member 26 has a second axial length $L_2$ in the axial direction Da. The first axial length $L_1$ of the male thread portion 30 is larger than the second axial length $L_2$ of the radially outer surface 36.

As seen in FIG. 3, the bicycle rear sprocket assembly 10 further comprises the second sprocket 38 (SP10). The second sprocket 38 includes a second tooth portion 38t and a second sprocket body 38b. The second tooth portion 38t has a plurality of teeth. In the following description, the total number of teeth of the second sprocket 38 is referred to as a second total tooth number. The second sprocket 38 has the second total tooth number that is larger than the first total tooth number. Preferably, the second total tooth number is eleven.

The second sprocket body 38b includes a second bicycle inbound facing surface 40, a second bicycle outbound facing surface 42, a second torque-transmitting structure 44, a third torque-transmitting structure 46, a second connection portion 48, and a protrusion portion 50. That is, the second sprocket 38 includes the second bicycle inbound facing surface 40, the second bicycle outbound facing surface 42, the second torque-transmitting structure 44, and the third torque-transmitting structure 46. The second bicycle inbound facing surface 40 faces toward the axial centerline CL of the bicycle rear hub assembly 1. The second bicycle outbound facing surface 42 is opposite to the second bicycle inbound facing surface 40 in the axial direction Da. In other words, the second bicycle outbound facing surface 42 faces in a reverse direction with respect to the axial direction Da in comparison with the second bicycle inbound facing surface 40.

The second torque-transmitting structure 44 is connected to the second bicycle inbound facing surface 40 via the second connection portion 48. That is, the second torque-transmitting structure 44 is provided to the second bicycle inbound facing surface 40. The second connection portion 48 has an axial length in the axial direction Da which is shorter than a sprocket pitch P2 (FIG. 1) between the second sprocket 38 and the third sprocket 52. As seen in FIG. 4, the second torque-transmitting structure 44 includes a plurality of second splines 44s. The plurality of second splines 44s can engage with the plurality of splines included in the torque-transmitting structure 4s. That is, the second torque-transmitting structure 44 is configured to engage with the torque-transmitting structure 4s provided to the sprocket support portion 4 of the bicycle rear hub assembly 1 in a state where the bicycle rear sprocket assembly 10 is mounted to the bicycle rear hub assembly 1.

The third torque-transmitting structure 46 is formed on the second bicycle outbound facing surface 42. The third torque-transmitting structure 46 is provided to the second bicycle outbound facing surface 42. The third torque-transmitting structure 46 is recessed in the axial direction Da to receive the first torque-transmitting structure 18 of the first sprocket 12. As seen in FIG. 5, the third torque-transmitting structure 46 includes a plurality of third splines 46s. The first torque-transmitting structure 18 includes a plurality of first splines 18s. The first splines 18s can engage with the third splines 46s. That is, the third torque-transmitting structure 46 is configured to engage with the first torque-transmitting structure 18 in the state where the bicycle rear sprocket assembly 10 is mounted to the bicycle rear hub assembly 1. As seen in FIG. 3, the protrusion portion 50 protrudes from the second connection portion 48 in the axial direction Da. The protrusion portion 50 is positioned radially outwardly from the second torque-transmitting structure 44 with respect to the rotational center axis Ax. The protrusion portion 50 is received in a stepped recess 54 of the third sprocket 52.

As seen in FIG. 3, the bicycle rear sprocket assembly 10 further comprises the third sprocket 52 (SP9). The third sprocket 52 includes a third tooth portion 52t and a third sprocket body 52b. The third tooth portion 52t has a plurality of teeth. In the following description, the total number of teeth of the third sprocket 52 is referred to as a third total tooth number. The third sprocket 52 has the third total tooth number that is larger than the second total tooth number. Preferably, the third total tooth number is thirteen.

The third sprocket body 52b includes the stepped recess 54, a third bicycle inbound facing surface 56, a third bicycle outbound facing surface 58, and a fourth torque-transmitting structure 60. That is, the third sprocket 52 includes the third bicycle inbound facing surface 56, the third bicycle outbound facing surface 58, and the fourth torque-transmitting structure 60. The third bicycle inbound facing surface 56 faces toward the axial centerline CL of the bicycle rear hub assembly 1. The third bicycle outbound facing surface 58 is opposite to the third bicycle inbound facing surface 56 in the axial direction Da. In other words, the third bicycle outbound facing surface 58 faces in a reverse direction with respect to the axial direction Da in comparison with the third bicycle inbound facing surface 56. The stepped recess 54 is formed on the third bicycle outbound facing surface 58. The stepped recess 54 is recessed in the axial direction Da to receive the protrusion portion 50 of the second sprocket 38.

The fourth torque-transmitting structure 60 extends from the stepped recess 54 to the fourth sprocket SP8 in the axial direction Da. That is, the fourth torque-transmitting structure 60 is provided to the third bicycle inbound facing surface 56. The fourth torque-transmitting structure 60 has an axial length in the axial direction Da which is longer than a sprocket pitch P3 (FIG. 1) between the third sprocket 52 and the fourth sprocket SP8. As seen in FIGS. 4 and 5, the fourth torque-transmitting structure 60 includes a plurality of fourth splines 60s. The plurality of fourth splines 60s can engage with the plurality of splines included in the torque-transmitting structure 4s. That is, the fourth torque-transmitting structure 60 is configured to engage with the torque-transmitting structure 4s provided to the sprocket support portion 4 of the bicycle rear hub assembly 1 in the state where the bicycle rear sprocket assembly 10 is mounted to the bicycle rear hub assembly 1.

The bicycle rear sprocket assembly 10 includes the following features.

(1) The bicycle rear sprocket assembly 10 includes the first sprocket 12 and the lock member 26. The first sprocket 12 includes the first opening 24, and the first torque-transmitting structure 18. The first opening 24 has the first diameter $D_1$ that is smaller than the radially outer diameter $D_O$ of the sprocket support portion 4. The first torque-transmitting structure 18 is provided to the first bicycle inbound facing surface 14 and configured to transmit pedaling torque to the second sprocket 38. The lock member 26 includes the main body 28, the male thread portion 30, and the radial projection 32. The main body 28 has the first axial end 28fe configured to pass through the first opening 24 of the first sprocket 12 and the second axial end 28re opposite to the first axial end 28fe in the axial direction Da. The male thread portion 30 is provided to the first axial end 28fe. The male thread portion 30 is configured to engage with the female thread portion 4t of the bicycle rear hub assembly 1 in the state where the bicycle rear sprocket assembly 10 is mounted to the bicycle rear hub assembly 1. The radial projection 32 extends radially outwardly from the second axial end 28re with respect to the rotational center axis Ax to restrict axial displacement of the first sprocket 12 with respect to the sprocket support portion 4 of the bicycle rear hub assembly 1 in the state where the bicycle rear sprocket assembly 10 is mounted to the bicycle rear hub assembly 1. Accordingly, it is possible to mount the first sprocket 12, which is a radially small sprocket having less than or equal to ten teeth, to the bicycle rear hub assembly 1 with the lock member 26. Therefore, a bicycle to which the bicycle rear sprocket assembly 10 is mounted can have a wide range of gear ratio.

(2) The main body 28 of the lock member 26 has the second diameter $D_2$ that is equal to or smaller than the first diameter $D_1$ of the first opening 24 of the first sprocket 12.

(3) The radial projection 32 is positioned farther from the axial centerline CL of the bicycle rear hub assembly 1 than the first bicycle inbound facing surface 14 of the first sprocket 12 in the state where the bicycle rear sprocket assembly 10 is mounted to the bicycle rear hub assembly 1.

(4) The radial projection 32 is configured to abut against the first bicycle outbound facing surface 16 of the first sprocket 12 in the state where the bicycle rear sprocket assembly 10 is mounted to the bicycle rear hub assembly 1.

(5) The first sprocket 12 has the first total tooth number that is equal to or smaller than ten.

(6) The second sprocket 38 includes the second bicycle inbound facing surface 40, the second torque-transmitting structure 44, and the third torque-transmitting structure 46. The second torque-transmitting structure 44 is provided to the second bicycle inbound facing surface 40. The third torque-transmitting structure 46 is configured to engage with the first torque-transmitting structure 18 in the state where the bicycle rear sprocket assembly 10 is mounted to the bicycle rear hub assembly 1.

(7) The second sprocket 38 has the second total tooth number that is larger than the first total tooth number. Specifically, the first total tooth number is equal to or smaller than ten and the second total tooth number is eleven.

(8) The second torque-transmitting structure 44 is configured to engage with the torque-transmitting structure 4s provided to the sprocket support portion 4 of the bicycle rear hub assembly 1 in the state where the bicycle rear sprocket assembly 10 is mounted to the bicycle rear hub assembly 1.

(9) The first sprocket 12 has the axially recessed portion 17 formed on the first bicycle outbound facing surface 16. The axially recessed portion 17 is configured to receive the radial projection 32 of the lock member 26 in the state where the bicycle rear sprocket assembly 10 is mounted to the bicycle rear hub assembly 1.

(10) The radial projection 32 has the first tapered surface 34. The axially recessed portion 17 has the second tapered surface 17s that fits the first tapered surface 34 of the radial projection 32 in the state where the bicycle rear sprocket assembly 10 is mounted to the bicycle rear hub assembly 1.

(11) The first sprocket 12 includes the first radially inner peripheral surface 20 around the rotational center axis Ax. The first radially inner peripheral surface 20 defines the first opening 24. The lock member 26 has the radially outer surface 36 configured to be spaced apart from the first radially inner peripheral surface 20 of the first sprocket 12 in the radial direction Dr with respect to the rotational center axis Ax in the state where the bicycle rear sprocket assembly 10 is mounted to the bicycle rear hub assembly 1.

(12) The male thread portion 30 of the lock member 26 has the first axial length $L_1$ in the axial direction Da. The radially outer surface 36 of the lock member 26 has the second axial length $L_2$ in the axial direction Da. The first axial length $L_1$ of the male thread portion 30 is larger than the second axial length $L_2$ of the radially outer surface 36.

(13) The third sprocket 52 includes the third bicycle inbound facing surface 56 and the fourth torque-transmitting structure 60. The fourth torque-transmitting structure 60 is provided to the third bicycle inbound facing surface 56. The fourth torque-transmitting structure 60 is configured to engage with the torque-transmitting structure 4s provided to the sprocket support portion 4 of the bicycle rear hub assembly 1 in the state where the bicycle rear sprocket assembly 10 is mounted to the bicycle rear hub assembly 1.

(14) The third sprocket 52 has the third total tooth number that is larger than the second total tooth number.

(15) The first torque-transmitting structure 18 includes a plurality of first splines 18s.

(16) The second torque-transmitting structure 44 includes a plurality of second splines 44s.

(17) The third torque-transmitting structure 46 includes a plurality of third splines 46s.

(18) The radial projection 32 is integrally formed with the main body 28 as a one-piece unitary member.

(19) The radial projection 32 has an annular flange shape.

(20) The bicycle rear sprocket assembly 10 further includes a plurality of additional sprockets SP1 to SP 8 each of which is larger than the first sprocket 12 and the second sprocket 38.

Second Embodiment

A bicycle rear sprocket assembly 210 in accordance with a second embodiment will be described below referring to FIG. 6. The bicycle rear sprocket assembly 210 has substantially the same structures as those of the bicycle rear sprocket assembly 10 except for the first sprocket 12 and the lock member 26. Thus, elements having substantially the same function as those in the first embodiment will be numbered the same here, and will not be described and/or illustrated again in detail here for the sake of brevity.

Figure 6:
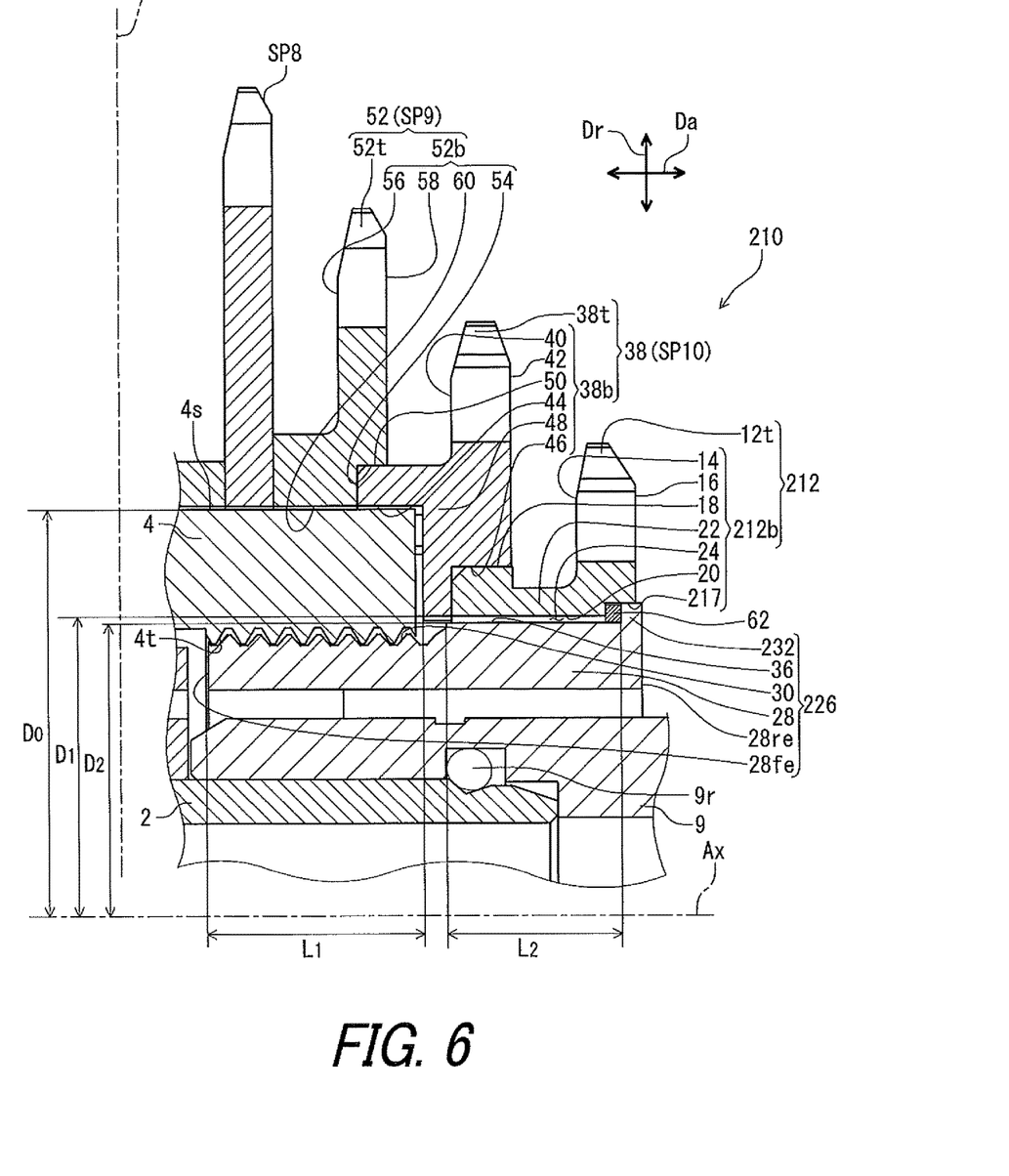
FIG. 6 is an enlarged partially cross-sectional view of a part P of the bicycle rear sprocket assembly in accordance with a second embodiment.

As seen in FIG. 6, the bicycle rear sprocket assembly 210 comprises a first sprocket 212 and a lock member 226. The first sprocket 212 includes the first tooth portion 12t and a first sprocket body 212b. Unlike the first sprocket body 12b of the first embodiment, the first sprocket body 212b includes an axially recessed portion 217 in place of the axially recessed portion 17 in the first embodiment. The axially recessed portion 217 is recessed in the axial direction Da. The axially recessed portion 217 provides an opening larger than the first opening 24 in the radial direction Dr. The bicycle rear sprocket assembly 210 further comprises an intermediate member 62. The intermediate member 62 can be a washer, for example. The intermediate member 62 is disposed in the opening provided by the axially recessed portion 217. The lock member 226 includes the main body 28, the male thread portion 30, and a radial projection 232. The radial projection 232 has a similar shape to a flange. The radial projection 232 is configured to indirectly abut against the first bicycle outbound facing surface 16 of the first sprocket 212 via the intermediate member 62 in the state where the bicycle rear sprocket assembly 210 is mounted to the bicycle rear hub assembly 1.

With the bicycle rear sprocket assembly 210, it is possible to obtain substantially the same effects as those of the bicycle rear sprocket assembly 10 in accordance with the first embodiment.

Furthermore, the bicycle rear sprocket assembly 210 includes the following features. The radial projection 232 is configured to indirectly abut against the first bicycle outbound facing surface 16 of the first sprocket 212 via the intermediate member 62 in the state where the bicycle rear sprocket assembly 210 is mounted to the bicycle rear hub assembly 1.

Third Embodiment

A bicycle rear sprocket assembly 310 in accordance with a third embodiment will be described below referring to FIG. 7. The bicycle rear sprocket assembly 310 has substantially the same structures as those of the bicycle rear sprocket assembly 10 except for at least one of the first sprocket 12 and the lock member 26. Thus, elements having substantially the same function as those in the first embodiment will be numbered the same here, and will not be described and/or illustrated again in detail here for the sake of brevity.

Figure 7:
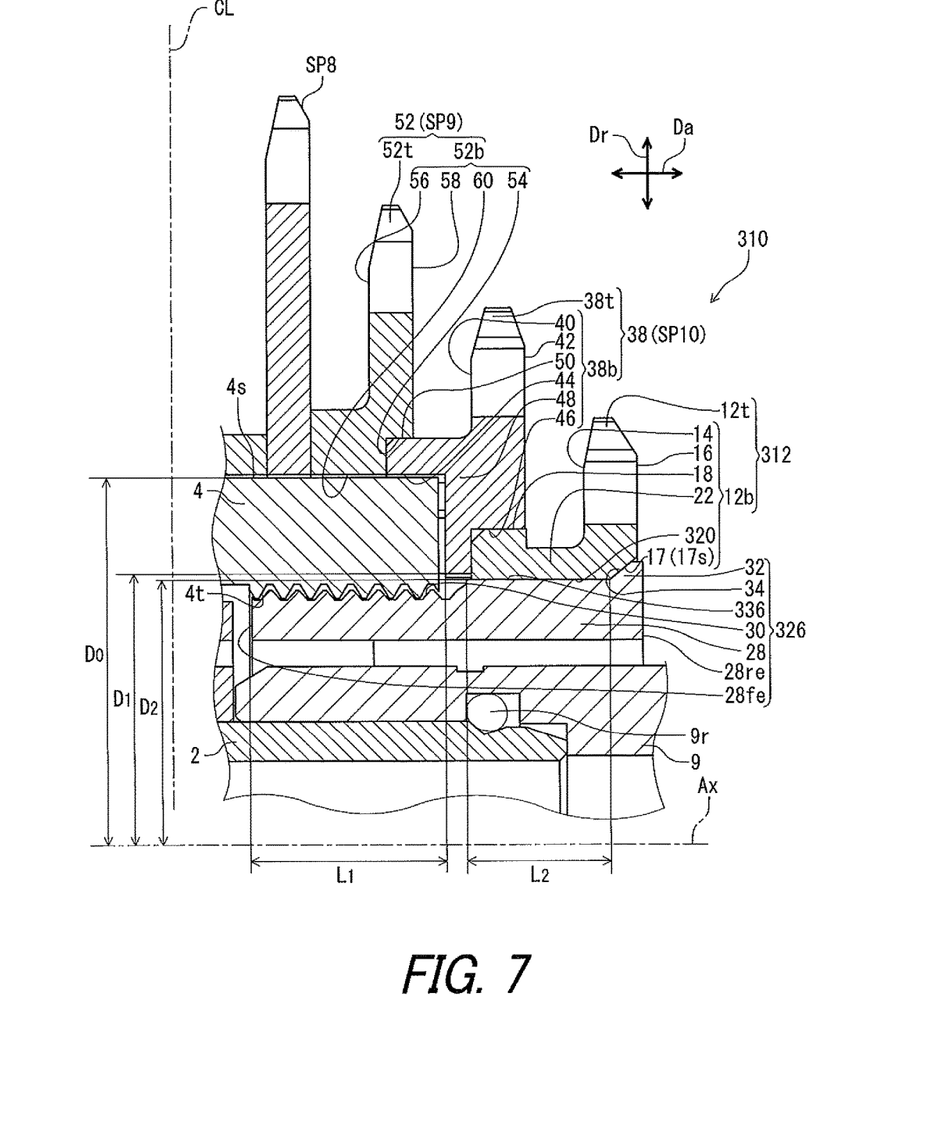
FIG. 7 is an enlarged partially cross-sectional view of a part P of the bicycle rear sprocket assembly in accordance with a third embodiment.

As seen in FIG. 7, the bicycle rear sprocket assembly 310 comprises a first sprocket 312 and a lock member 326. The first sprocket 312 and the lock member 326 have substantially the same structures as the first sprocket 12 and the lock member 26, respectively except for the positional relationship between the first radially inner peripheral surface 20 and the radially outer surface 36. In the following description, the first radially inner peripheral surface 20 in the third embodiment is referred to as a first radially inner peripheral surface 320, and the radially outer surface 36 in the third embodiment is referred to as a radially outer surface 336. In this embodiment, at least a part of the first radially inner peripheral surface 320 is in contact with the radially outer surface 336. This means the lock member 326 has the radially outer surface 336 configured to support the first radially inner peripheral surface 320 of the first sprocket 312 in the state where the bicycle rear sprocket assembly 310 is mounted to the bicycle rear hub assembly 1.

With the bicycle rear sprocket assembly 310, it is possible to obtain substantially the same effects as those of the bicycle rear sprocket assembly 10 in accordance with the first embodiment.

Furthermore, the bicycle rear sprocket assembly 310 includes the following features. The lock member 326 has the radially outer surface 336 configured to support the first radially inner peripheral surface 320 of the first sprocket 312 in the state where the bicycle rear sprocket assembly 310 is mounted to the bicycle rear hub assembly 1.

It will be apparent to those skilled in the bicycle field from the present disclosure that the structures and/or configurations of the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear sprocket assembly configured to be mounted to a sprocket support portion of a bicycle rear hub assembly, the bicycle rear sprocket assembly comprising:
   a first sprocket including:
      a first bicycle inbound facing surface;
      a first bicycle outbound facing surface opposite to the first bicycle inbound facing surface in an axial direction parallel to a rotational center axis of the bicycle rear sprocket assembly;
      a first opening having a first diameter that is smaller than a radially outer diameter of the sprocket support portion of the bicycle rear hub assembly; and
      a first torque-transmitting structure provided to the first bicycle inbound facing surface and configured to transmit pedaling torque to a second sprocket adjacent to the first sprocket without another sprocket between the first sprocket and the second sprocket in the axial direction; and
   a lock member including:
      a main body having a first axial end configured to pass through the first opening of the first sprocket and a second axial end opposite to the first axial end in the axial direction, the first axial end being positioned closer to an axial centerline of the bicycle rear hub assembly than the second axial end in a state where the bicycle rear sprocket assembly is mounted to the bicycle rear hub assembly;
      a male thread portion provided to the first axial end, the male thread portion being configured to engage with a female thread portion of the bicycle rear hub assembly in the state where the bicycle rear sprocket assembly is mounted to the bicycle rear hub assembly; and
      a radial projection extending radially outwardly from the second axial end with respect to the rotational center axis to restrict axial displacement of the first sprocket with respect to the sprocket support portion of the bicycle rear hub assembly in the state where the bicycle rear sprocket assembly is mounted to the bicycle rear hub assembly.

2. The bicycle rear sprocket assembly according to claim 1, wherein
   the main body of the lock member has a second diameter that is equal to or smaller than the first diameter of the first opening of the first sprocket.

3. The bicycle rear sprocket assembly according to claim 1, wherein
   the radial projection is positioned farther from the axial centerline of the bicycle rear hub assembly than the first bicycle inbound facing surface of the first sprocket in the state where the bicycle rear sprocket assembly is mounted to the bicycle rear hub assembly.

4. The bicycle rear sprocket assembly according to claim 1, wherein
   the radial projection is configured to abut against the first bicycle outbound facing surface of the first sprocket in the state where the bicycle rear sprocket assembly is mounted to the bicycle rear hub assembly.

5. The bicycle rear sprocket assembly according to claim 1, wherein
   the radial projection is configured to indirectly abut against the first bicycle outbound facing surface of the first sprocket via an intermediate member in the state where the bicycle rear sprocket assembly is mounted to the bicycle rear hub assembly.

6. The bicycle rear sprocket assembly according to claim 1, wherein
   the first sprocket has a first total tooth number that is equal to or smaller than ten.

7. The bicycle rear sprocket assembly according to claim 1, further comprising:
   the second sprocket including:
      a second bicycle inbound facing surface;
      a second bicycle outbound facing surface opposite to the second bicycle inbound facing surface in the axial direction;
      a second torque-transmitting structure provided to the second bicycle inbound facing surface; and
      a third torque-transmitting structure provided to the second bicycle outbound facing surface, the third torque-transmitting structure being configured to engage with the first torque-transmitting structure in the state where the bicycle rear sprocket assembly is mounted to the bicycle rear hub assembly.

8. The bicycle rear sprocket assembly according to claim 7, wherein
   the first sprocket has a first total tooth number, and
   the second sprocket has a second total tooth number that is larger than the first total tooth number.

9. The bicycle rear sprocket assembly according to claim 8, wherein the first total tooth number is equal to or smaller than ten, and the second total tooth number is eleven.

10. The bicycle rear sprocket assembly according to claim 7, wherein the second torque-transmitting structure is configured to engage with a torque-transmitting structure provided to the sprocket support portion of the bicycle rear hub assembly in the state where the bicycle rear sprocket assembly is mounted to the bicycle rear hub assembly.

11. The bicycle rear sprocket assembly according to claim 1, wherein the first sprocket has an axially recessed portion formed on the first bicycle outbound facing surface, and the axially recessed portion is configured to receive the radial projection of the lock member in the state where the bicycle rear sprocket assembly is mounted to the bicycle rear hub assembly.

12. The bicycle rear sprocket assembly according to claim 11, wherein the radial projection has a first tapered surface, and the axially recessed portion has a second tapered surface that fits the first tapered surface of the radial projection in the state where the bicycle rear sprocket assembly is mounted to the bicycle rear hub assembly.

13. The bicycle rear sprocket assembly according to claim 1, wherein the first sprocket includes a first radially inner peripheral surface around the rotational center axis, the first radially inner peripheral surface defining the first opening, and the lock member has a radially outer surface configured to support the first radially inner peripheral surface of the first sprocket in the state where the bicycle rear sprocket assembly is mounted to the bicycle rear hub assembly.

14. The bicycle rear sprocket assembly according to claim 13, wherein the male thread portion of the lock member has a first axial length in the axial direction, the radially outer surface of the lock member has a second axial length in the axial direction, and the first axial length of the male thread portion is larger than the second axial length of the radially outer surface.

15. The bicycle rear sprocket assembly according to claim 1, wherein the first sprocket includes a first radially inner peripheral surface around the rotational center axis, the first radially inner peripheral surface defining the first opening, and the lock member has a radially outer surface configured to be spaced apart from the first radially inner peripheral surface of the first sprocket in a radial direction with respect to the rotational center axis in the state where the bicycle rear sprocket assembly is mounted to the bicycle rear hub assembly.

16. The bicycle rear sprocket assembly according to claim 15, wherein the male thread portion of the lock member has a first axial length in the axial direction, the radially outer surface of the lock member has a second axial length in the axial direction, and the first axial length of the male thread portion is larger than the second axial length of the radially outer surface.

17. The bicycle rear sprocket assembly according to claim 1, further comprising:

the second sprocket including:
a second bicycle inbound facing surface;
a second bicycle outbound facing surface opposite to the second bicycle inbound facing surface in the axial direction;
a second torque-transmitting structure provided to the second bicycle inbound facing surface; and
a third torque-transmitting structure provided to the second bicycle outbound facing surface, the third torque-transmitting structure being configured to engage with the first torque-transmitting structure in the state where the bicycle rear sprocket assembly is mounted to the bicycle rear hub assembly; and a third sprocket including:
a third bicycle inbound facing surface;
a third bicycle outbound facing surface opposite to the third bicycle inbound facing surface in the axial direction; and
a fourth torque-transmitting structure provided to the third bicycle inbound facing surface, the fourth torque-transmitting structure being configured to engage with a torque-transmitting structure provided to the sprocket support portion of the bicycle rear hub assembly in the state where the bicycle rear sprocket assembly is mounted to the bicycle rear hub assembly.

18. The bicycle rear sprocket assembly according to claim 17, wherein the first sprocket has a first total tooth number, the second sprocket has a second total tooth number that is larger than the first total tooth number, and the third sprocket has a third total tooth number that is larger than the second total tooth number.

19. The bicycle rear sprocket assembly according to claim 1, wherein the first torque-transmitting structure includes a plurality of first splines.

20. The bicycle rear sprocket assembly according to claim 7, wherein the second torque-transmitting structure includes a plurality of second splines.

21. The bicycle rear sprocket assembly according to claim 20, wherein the third torque-transmitting structure includes a plurality of third splines.

22. The bicycle rear sprocket assembly according to claim 1, wherein the radial projection is integrally formed with the main body as a one-piece unitary member.

23. The bicycle rear sprocket assembly according to claim 1, wherein the radial projection has an annular flange shape.

24. The bicycle rear sprocket assembly according to claim 7, further comprising:

a plurality of additional sprockets each of which is larger than the first sprocket and the second sprocket.

* * * * *